(12) United States Patent
Bryan, III

(10) Patent No.: US 6,450,743 B1
(45) Date of Patent: Sep. 17, 2002

(54) RAILROAD CAR ROADWAY TRANSPORT SYSTEM

(76) Inventor: William Bryan, III, P.O. Box 1663, Tifton, GA (US) 31793

( * ) Notice: Subject to any disclaimer, the term of this patent is extended or adjusted under 35 U.S.C. 154(b) by 0 days.

(21) Appl. No.: 09/620,548

(22) Filed: Jul. 22, 2000

Related U.S. Application Data

(60) Provisional application No. 60/145,285, filed on Jul. 23, 1999.

(51) Int. Cl.$^7$ .................................................. B60P 7/08
(52) U.S. Cl. .......................................... 410/53; 410/52
(58) Field of Search ............................ 410/52, 53, 57; 414/809; 105/4.2, 4.1, 72.2, 215.2

(56) References Cited

U.S. PATENT DOCUMENTS

| | | | |
|---|---|---|---|
| 2,703,659 A | * 3/1955 | Hutchins | 410/57 X |
| 2,756,073 A | * 7/1956 | Bridge | 410/53 X |
| 2,787,971 A | * 4/1957 | Obes | 410/53 X |
| 2,876,016 A | * 3/1959 | McClellan | 410/53 |
| 2,879,719 A | * 3/1959 | Gaebler | 410/53 X |
| 3,317,219 A | * 5/1967 | Hindin et al. | 410/53 |
| 4,086,856 A | 5/1978 | Chenoweth | |
| 4,416,571 A | 11/1983 | Krause | |
| 4,685,399 A | * 8/1987 | Baker | 410/53 X |
| 4,922,832 A | 5/1990 | Lienard et al. | |
| 4,961,676 A | * 10/1990 | Gourdin | 410/53 |
| 5,168,815 A | 12/1992 | Comer et al. | |
| 5,220,870 A | 6/1993 | Larson | |

* cited by examiner

*Primary Examiner*—Stephen T. Gordon
(74) *Attorney, Agent, or Firm*—Brian D. Bellamy

(57) ABSTRACT

A railroad car transport system for transporting a railway car on a roadway in which a carriage assembly receives the rear end of a railway car and supports the rear end of the railway car during transport. A gooseneck receives the front end of the railway car and supports the front end of the railway car during transport. The carriage assembly and gooseneck together support the railway car and form a unitary body resembling a trailer that may be towed by a semi-tractor on a roadway.

4 Claims, 3 Drawing Sheets

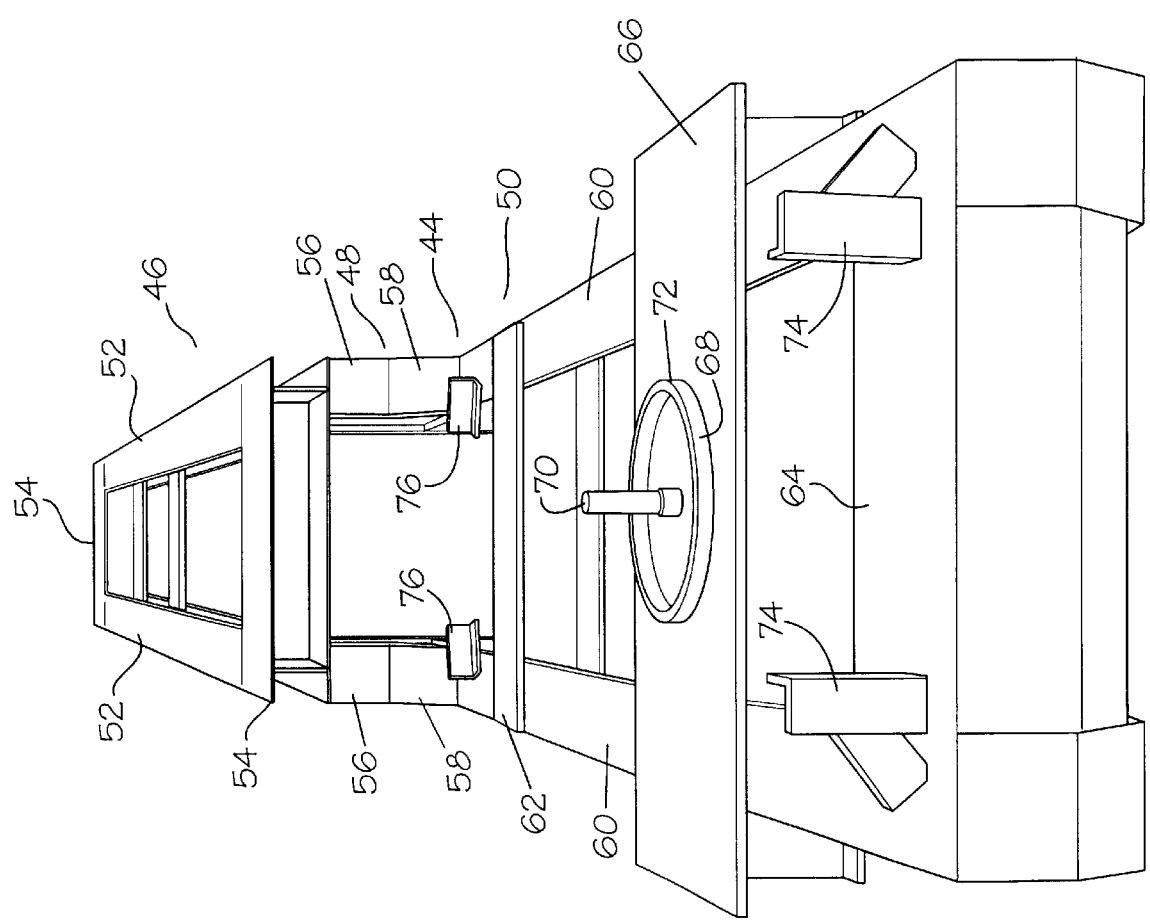

RAILROAD CAR ROADWAY TRANSPORT SYSTEM

DOMESTIC PRIORITY CLAIM

The priority of U.S. provisional application No. 60/145,285, filed Jul. 23, 1999 is claimed.

INTRODUCTION

This invention pertains to a system for transporting derailed railroad cars along roadways. More particularly, this invention relates to a railroad car carriage system useful for moving railroad cars that are derailed and slightly damaged. The carriage system has a rear carriage assembly and a front carriage assembly that support a derailed railroad car and couple to a tractor trailer fifth wheel hitch for towing.

BACKGROUND OF THE INVENTION

Anytime that railroad cars derail from railway tracks many of the railroad cars are damaged. Frequently, the damaged cars are torn apart for scrap and parts because of the cost and difficulty in moving the derailed cars to a location where they can be repaired. However, some of the damaged cars are generally fit to be reconditioned except for the cost or difficulty of relocation for repair. Previously, cars fit for repair could be moved by setting them on a flat railroad car. However, setting these cars on a flat car can often be difficult and in some case the damaged cars are too tall to be carried on a flat car. Therefore, a means for more conveniently transporting damaged railroad cars by roadway would be highly desirable.

BRIEF DESCRIPTION OF THE DRAWINGS

FIG. 3 is a perspective view of the front carriage assembly of the present invention.

DETAILED DESCRIPTION

Figure 1:
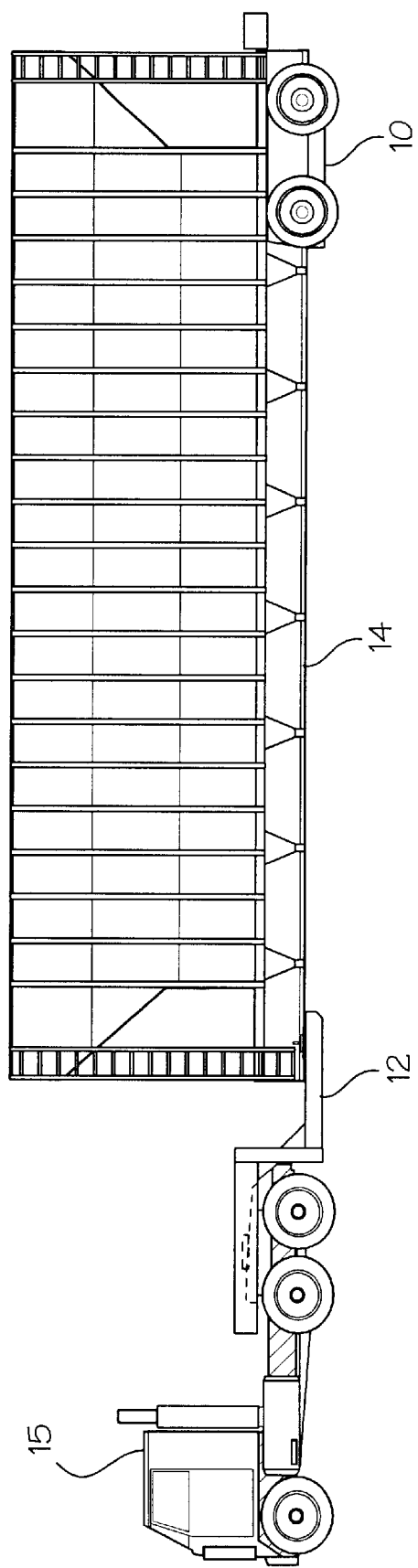
FIG. 1 is a side view of the railroad car transport system of the present invention shown in tow by a tractor.

Referring to the drawings, FIG. 1 illustrates the present invention. The two primary components of the invention are a carriage assembly 10 and a gooseneck 12 that are separate components to be placed under each end of a railroad car 14. The carriage assembly supports the underside of the rear of a railroad car and the gooseneck supports the front of a railroad car to form a unitary body that resembles a trailer and is towed by a semi-tractor 15.

Figure 2:
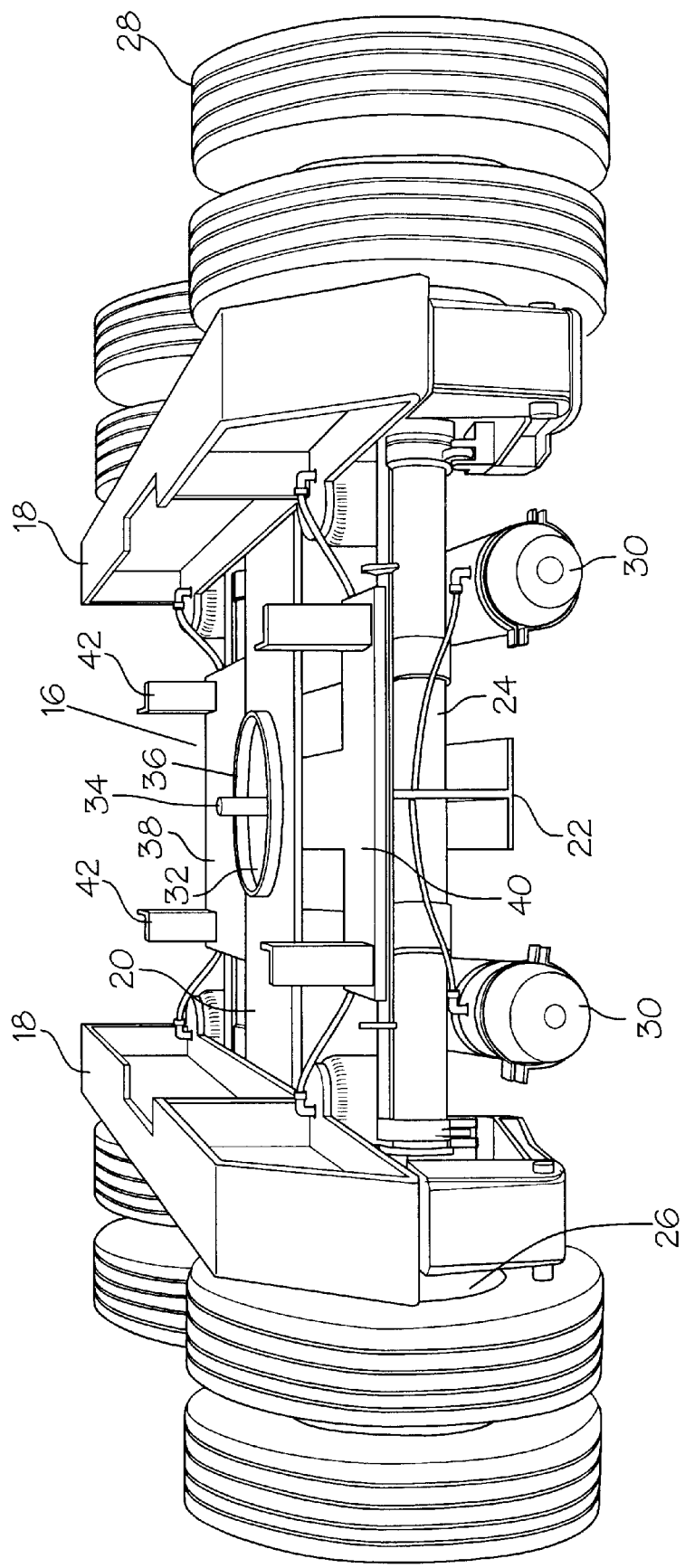
FIG. 2 is a perspective view of the rear carriage assembly of the present invention.

As illustrated in FIG. 2, the carriage assembly comprises a reinforced frame structure 16 having a pair of longitudinally disposed exterior beams 18, a cross member 20 disposed latitudinally between the exterior beams, and a center beam 22 disposed longitudinally between the exterior beams and attached beneath the cross member. The frame structure provides the required strength for the carriage assembly to support an end of a railroad car. Further, the frame structure provides for the stability of the railroad car during roadway transport.

A pair of axle assemblies 24 are attached to the underside of the frame, whereby wheels 26 and tires 28, like those used to support semi-tractor trailers, are attached to each end of the axles for support and transport of the carriage assembly 10 on a roadway. An air brake assembly 30 is provided for each axle, and a temporary air line means is provided for communicating braking instructions between the cab of a semi-tractor and air brake assembly.

In normal operation, a railroad car has a center sill at its trailing end that is situated on a center bowl on a carriage having rail wheels. After derailment the carriage assembly 10 herein replaces the rail wheel carriage and fits in its same location under the railroad car 14. When situated for transport by roadway in accordance with the present system, the present system provides the carriage assembly 10, or trailing end, that includes a center bowl 32 and pin 34 that couple to the preexisting center sill on the bottom of the railroad car. The center bowl consists of a narrow circular shoulder 36 that extends out from the center of a flat cross member 20 running latitudinally between the exterior beams 18. The pin extends vertically from a position in the center of the center bowl and consists of a cylindrical column. A first flat surface member 38 and a second flat surface member 40 are mounted at each end of the center beam 22. Each flat surface member supports a pair of vertically disposed pillars 42 extending upwardly from the surface. The pillars assist in supporting the railroad car once it is placed on the carriage assembly.

Once the railroad car 14 is loaded on the carriage assembly 10, a temporary light fixture for providing running lights and brakes lights may be attached to the rear of the railroad car to enhance the transport system. Further, temporary electrical lines may be run from the tractor to the lighting fixture to provide means for operating the lights.

As illustrated in FIG. 3, the gooseneck 12, or leading end, comprises a frame structure 44 having three distinct portions. The upper portion 46 of the frame structure provides a neck that couples to the fifth wheel of a semi-tractor. The middle portion 48 of the frame structure provides a descending beam structure for attaching the upper portion to a lower portion. And, the lower portion 50 of the frame structure provides a means for coupling the gooseneck to a derailed railroad car 14.

In the present embodiment the upper portion 46 comprises a pair of parallel beam members 52 running longitudinally. A cross member 54 at each end complete the rectangular shape of the upper portion. A downwardly extending pin is attached to a cross member at the front end of the upper portion for coupling the upper portion to the fifth wheel hitch.

Similarly, the middle portion 48 comprises a pair of parallel beam members 56. The beam members attach to the upper portion 46 and extend downward at a slight angle to attach to the lower portion 50. The beams may be reinforced as shown in FIG. 3 by triangular reinforcement members 58. The front end of the lower portion of the gooseneck is disposed slightly behind the rear end of the upper portion and likewise comprises a pair of parallel beam members 60 running longitudinally that attach to the middle portion.

The lower portion 50 of the gooseneck 12 is designed to support the front end of a derailed railroad car 14. The lower portion is reinforced by a first cross member 62 at its front end and a second cross member 64 at its rear end. A third cross member 66 having an upper surface is attached to the longitudinal beam members 60 at about the middle of their length. The third cross member extends beyond the edges of the beam members to provide support for the wide railroad cars. The lower portion includes a center bowl 68 and pin 70 like that of the carriage assembly 10 that couples to the preexisting center sill on the bottom of the railroad car. The carriage assembly couples a first end of the railroad car, and the gooseneck couples to the remaining end of the railroad car. On the lower portion, the center bowl consists of a narrow circular shoulder 72 that extends out from the center of the upper surface of the third cross member. The pin extends vertically from the center of the center bowl and consists of a cylindrical column.

A pair of vertically disposed pillars 74 extending upwardly are appended to the second cross member 64 at the rear end of the lower portion 50. The pillars assist in positioning the railroad car 14 on the gooseneck 12. Additional angle irons 76 are appended toward the front end of the lower portion's beam members 60 to provide means for reinforcing the position of the railroad car on the gooseneck. Once the center sill of the railroad car is placed on the center sill bowl 68 of the gooseneck's lower portion, several large bolts or other like means are used to affix the gooseneck to the railroad car. Thereby, the gooseneck becomes a rigid member of the railroad car frame.

In practice, after attaching the gooseneck 12 to the railroad car 14, a crane should be used to lift the gooseneck end of the railway car. Whereby, a tractor 15 may be positioned under the gooseneck to couple the gooseneck to the fifth wheel hitch of the tractor. Upon coupling the gooseneck to the tractor, the railroad car transport system forms a tractor trailer combination as shown in FIG. 1.

I claim:

1. A method of transporting a railway car having a rear end and a front end comprising the steps of:
   a. providing a carriage assembly;
   b. coupling the carriage assembly beneath the rear end of the railway car via a preexisting center sill on the rear end of the railway car;
   c. providing a gooseneck having a lower body portion, a middle body portion connected to the lower body portion, and an upper body portion connected to the middle body portion;
   d. coupling the gooseneck beneath the front end of the railway car by attaching the lower body portion of the gooseneck to a preexisting center sill on the front end of the railway car;
   e. coupling the upper body portion of the gooseneck to a vehicle for transport.

2. A method of transporting a railway car having a rear end and a front end as claimed in claim 1, further comprising the steps of:
   a. providing an air brake assembly on said carriage assembly that communicates with the towing vehicle; and
   b. providing a temporary light fixture attached to said rear end of said railway car for providing running lights and brake lights and providing temporary electrical lines from the temporary light fixture to said vehicle for operating the running lights and brake lights.

3. A method of transporting a railway car having a rear end and a front end as claimed in claim 1, in which said gooseneck is affixed to said railway car using at least one bolt after coupling said gooseneck beneath said front end of said railway car.

4. A method of transporting a railway car having a rear end and a front end as claimed in claim 1, in which the step of coupling the upper body portion of the gooseneck to said vehicle for transport includes coupling said upper body portion of said gooseneck to a fifth wheel hitch of a semi-tractor trailer.

* * * * *